United States Patent [19]

Ikeda

[11] Patent Number: 4,818,985
[45] Date of Patent: Apr. 4, 1989

[54] BUS ARBITRATION NETWORK CAPABLE OF QUICKLY CARRYING OUT ARBITRATION AMONG BUS MASTERS

[75] Inventor: Sadanobu Ikeda, Tokyo, Japan

[73] Assignee: NEC Corporation, Tokyo, Japan

[21] Appl. No.: 123,879

[22] Filed: Nov. 23, 1987

[30] Foreign Application Priority Data

Nov. 22, 1986 [JP] Japan .................................. 61-277841

[51] Int. Cl.[4] .............................................. H04Q 1/00
[52] U.S. Cl. ............................ 340/825.5; 340/825.51; 370/85
[58] Field of Search ....................... 340/825.5, 825.51; 364/200; 370/85, 110.1

[56] References Cited

U.S. PATENT DOCUMENTS

| 4,145,735 | 3/1979 | Soga | 340/825.51 X |
| 4,542,380 | 9/1985 | Beckner et al. | 340/825.5 |
| 4,631,534 | 12/1986 | Franklin et al. | 340/825.5 |
| 4,654,655 | 3/1987 | Kowalski | 340/825.5 |
| 4,669,079 | 5/1987 | Blum | 340/825.5 X |
| 4,703,420 | 10/1987 | Irwin | 364/200 |
| 4,740,956 | 4/1988 | Hailpern et al. | 370/85 |

Primary Examiner—Ulysses Weldon
Attorney, Agent, or Firm—Burns, Doane, Swecker & Mathis

[57] ABSTRACT

In a bus arbitration network comprising a common bus network, a plurality of bus masters, and a bus arbiter, each of the bus masters supplies others of the bus masters through the common bus network with either a normal bus request signal or a particular bus request signal having a high priority in comparison with the normal bus request signal. A bus request signal is also supplied from each bus master to the bus arbiter which delivers a bus acknowledgement signal to each bus master. Supply of either the normal or the particular bus request signal and the bus request signal is prohibited by each bus master when each bus master is supplied with the particular bus request signal from the other bus masters. A lock signal may be delivered from each bus master to the other bus masters through the common bus network to continuously use the common bus network. Reception of such a lock signal in each bus master results in interruption of production of either the normal or the particular bus request signal and the bus request signal.

6 Claims, 8 Drawing Sheets

| SIGNALS ON BUS | | | | STATES OF ARBITRATION |
|---|---|---|---|---|
| CBRL/ | CBRH/ | BREQ/ | BACK/ | |
| H | H | H | H | IDLE STATE |
| L | H | H | H | BUSY STATE DUE TO NORMAL REQUEST |
| H | L | H | H | BUSY STATE DUE TO PARTICULAR REQUEST |
| L | L | H | H | " |
| L | H | L | H | DURING NORMAL REQUEST |
| L | L | L | H | DURING PARTICULAR REQUEST |
| L | H | L | L | ACKNOWLEDGEMENT OF NORMAL REQUEST |
| H | L | L | L | ACKNOWLEDGEMENT OF PARTICULAR REQUEST |
| L | H | L | L | " |
| H | H | L | X | PROHIBITION |
| X | X | H | L | " |

FIG. 8

BUS ARBITRATION NETWORK CAPABLE OF QUICKLY CARRYING OUT ARBITRATION AMONG BUS MASTERS

BACKGROUND OF THE INVENTION

This invention relates to a bus arbitration network which is for use in an information processing system which comprises a common bus network, a plurality of bus masters, and a bus arbiter. It is to be noted throughout the instant specification that each of the bus masters may be a microcomputer, a channel device, an I/O control adapter, and the like and is connected in common to the common bus network and that the information processing system may therefore be a digital electronic computer system or a controller system of a bus structure.

In an information processing system of the type described, mutual communication is carried out between a plurality of bus masters through a common bus network. During mutual communication, the common bus network is occupied or monopolized by the bus masters which are in course of communication while the others of the bus masters are kept in a quiescent state.

With this information processing system, a request or requisition is sent from each bus master to the common bus network at the beginning of communication so as to acquire a right to use the common bus network and to monopolize the common bus network. The request may be called a common bus request while the right to use the common bus network may simply be called a right of use.

Such common bus requests often collide with one another on the common bus network. A degree of priority is assigned to the bus masters in case collision of the common bus requests happens on the common bus network. The right of use is given to a selected one of the bus masters that has a degree of priority higher than any other bus masters and that can start communication.

At any rate, common bus requests must be arbitrated in the information processing network. For this purpose, a bus arbiter is often coupled to the common bus network to process or arbitrate collision of the common bus requests and to select the bus masters.

As a rule, arbitration is carried out in consideration of a degree of emergency to decide order of acquiring the right of use when the common bus requests are issued from a plurality of the bus masters. More specifically, the right of use should be decided so that the common bus network is fairly used or occupied by each of the bus masters, provided that an emergency request or particular request can be received by the bus arbiter. In addition, the arbitration must assure availability of a bus master of a lowest degree of priority within a predetermined duration and must be completed in a short time. Otherwise, data transmission is adversely affected.

Conventional arbitration needs a complicate bus arbiter circuit and wastes a very long time in order to meet fairness of arbitration. On the other hand, the arbitration indispensably becomes unfair by the use of a simple arbiter circuit so as to shorten a time for arbitration. This results in degradation of performance in a whole information processing system.

SUMMARY OF THE INVENTION

It is an object of this invention to provide a bus arbitration network which can quickly carry out arbitration within a short time.

It is another object of this invention to provide a bus arbitration network of the type described, which can accomplish fairness of arbitration by a simple structure.

According to this invention, a bus arbitration network comprises a common bus network, a plurality of bus masters, and an arbiter coupled to the bus masters through the common bus network for arbitrating use of the common bus network. Each of the bus masters carries out communication with others of the bus masters through the common bus network and comprises internal request producing means for producing an internal normal request signal and an internal particular request signal which indicate an internal normal request and an internal particular request and which are related to use of the common bus network, first supply means coupled to the internal request producing means for supplying the others of the bus masters through the common bus network with a normal bus request signal and a particular bus request signal in response to the internal normal request signal and the internal particular request signal, respectively, and second supply means coupled to the first supply means for supplying the bus arbiter with a bus request signal in response to each of the internal normal request signal and the internal particular request signal. The bus arbiter comprises means responsive to the bus request signals sent from the bus masters for selecting one of the bus masters as a selected bus master, and means for delivering to the selected bus master an acknowledgement signal representative of an acknowledgement of the use of the common bus network. Each bus master further comprises means for indicating start of the communication in response to the acknowledgement signal.

BRIEF DESCRIPTION OF THE DRAWING

FIG. 8 shows a relationship between signals on buses and states of arbitration.

DESCRIPTION OF THE PREFERRED EMBODIMENTS

Figure 1:
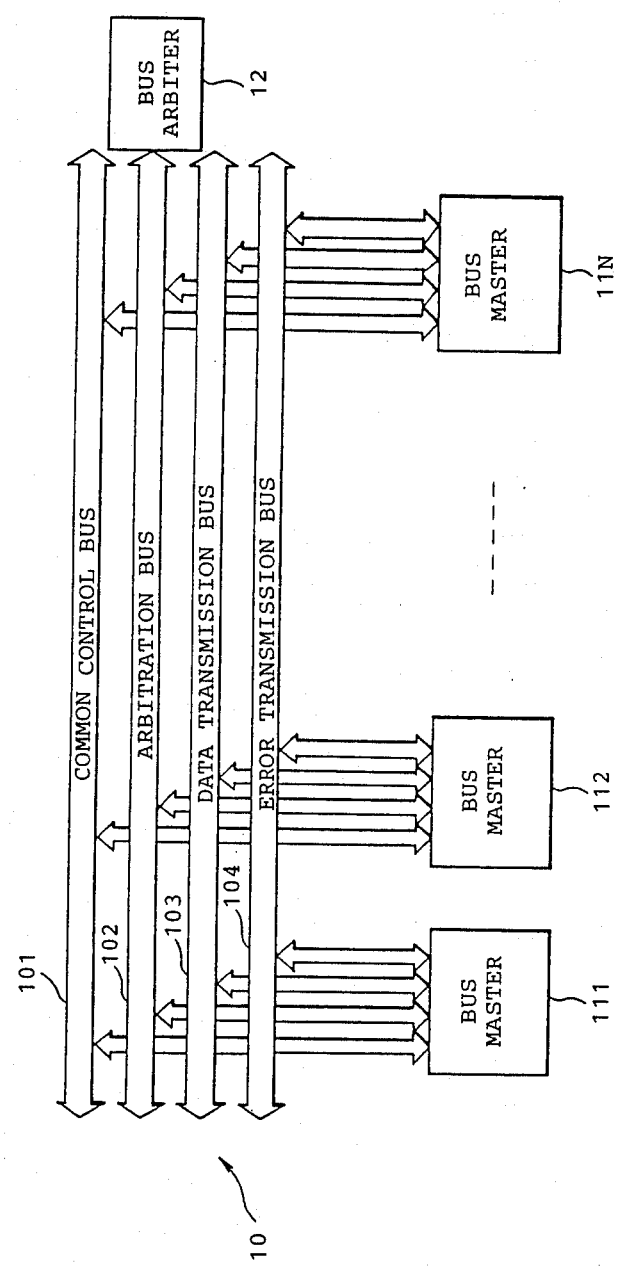
FIG. 1 is a block diagram of an information processing system to which this invention is applicable.

Referring to FIG. 1, a bus arbitration network to which this invention is applicable will be described for a better understanding of this invention. The bus arbitration network comprises a common bus network 10, first through N-th bus masters 111 to 11N, such as microcomputers or the like, and a bus arbiter 12 for arbitrating use of the common bus network 10 in a manner to be described later. Each of the bus masters 111 to 11N is communicable with each of the other bus masters or indicated bus masters through the common bus arbiter 10. In this event, each bus master acquires a right to use the common bus network 10 under control of the bus arbiter 12 and becomes an owner of the right to use the common bus network 10. In ths connection, the right may be called a right of use and the owner of the right will be referred to as a bus owner. On the other hand, the indicated bus masters will be called bus slaves.

The illustrated common bus network 10 is grouped into a common control bus 101, an arbitration bus 102, a data transmission bus 103, and an error transmission bus 104. Each of the bus masters 111 to 11N is connected to the common control bus 101, the arbitration bus 102, the data transmission bus 103, and the error transmission bus 104 while the bus arbiter 12 is connected only to the arbitration bus 102. The common control bus 101 is used to transmit or deliver a bus clock, an initialization signal, and the like to every one of the bus masters 111 to 11N while the data transmission bus 103 is used to carry out transmission of a command, an address, a shakehand signal, a data signal, and so on between a bus owner and a bus slave. The error transmission bus 104 is used to transmit an error signal from a bus slave to a bus owner on detection of an error in the data transmission.

It is to be noted that the arbitration bus 102 serves to assign the common bus network 10 to a selected one of the bus masters 111 to 11N under control of the bus arbiter 12 in a manner to be described later.

Figure 2:
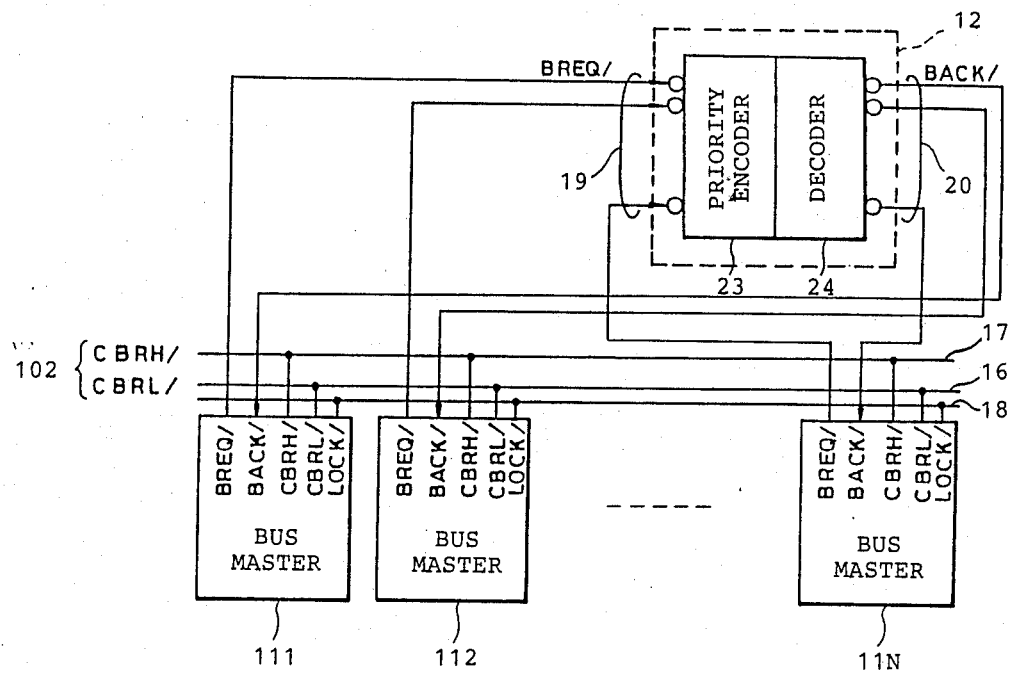
FIG. 2 is a block diagram of a bus arbitration network according to a preferred embodiment of this invention.

Referring to FIG. 2, a bus arbitration network according to a preferred embodiment of this invention comprises similar parts designated by like reference numerals. The arbitration bus 102 alone is illustrated in FIG. 2 in detail so as to describe arbitration operations carried out by the use of the arbitration bus 102 and comprises first, second, third, fourth, and fifth lines or paths 16, 17, 18, 19, and 20. The first through third lines 16 to 18 connect the bus masters 111 to 11N to one another while the fourth and the fifth lines 19 and 20 connect the bus masters 111 through 11N· to the bus arbiter 12.

Herein, the fourth lines 19 serve to transmit bus request signals BREQ/ from the respective bus masters 111 through 11N to the bus arbiter 12 while the fifth lines 20 serve to transmit bus acknowledgement signals BACK/ from the bus arbiter 12 to each of the bus masters 111 to 11N, where the slashes after the BREQ and the BACK indicate that the signals BREQ and BACK are active when they are low. Such slashes will also be attached in the same meaning to any other signals appearing on the first through fifth lines 16 to 20.

The bus request signals BREQ/ are representative of requests to use the common bus network 102 in the respective bus masters 111 to 11N while the bus acknowledgement signals BACK/ are representative of acknowledgement or permission of using the common bus network 102.

The bus arbiter 12 is supplied with each of the bus request signals BREQ/ and offers a degree of priority to each bus request signal to send the bus acknowledgement signal BACK to a selected one of the bus masters 111 to 11N that has a highest degree of priority. For this purpose, the bus arbiter 12 comprises a priority encoder 23 for encoding the bus requests BREQ/ into a priority signal representative of a highest degree of priority and a decoder 24 for decoding the priority signal into a decoded signal representative of one of the bus masters that has the highest degree of priority. The decoded signal is delivered to the one bus master as the acknowledgement signal BACK. At any rate, the priority encoder 23 indicates a selected one of the bus masters that has the highest degree of priority. This shows that the priority encoder 23 serves to select one of the bus masters 111 to 11N and to decide the one of the bus masters 111 to 11N as the selected bus master. Thus, the priority encoder 23 serves to select one of the bus masters 111 to 11N while the decoder 24 serves to deliver the acknowledgement signal BACK to the one of the bus masters 111 to 11N.

Figure 3:
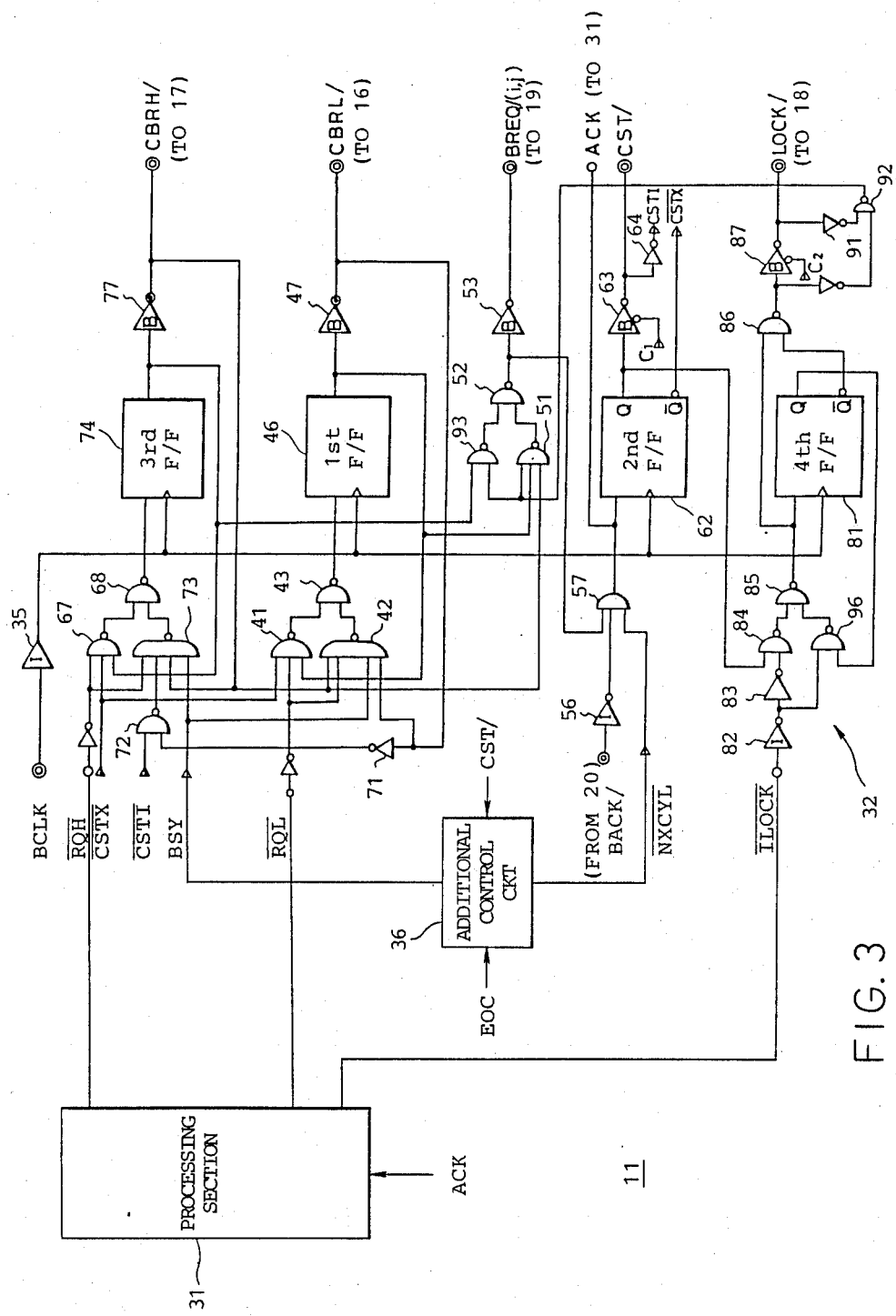
FIG. 3 is a block diagram of a bus master used in the bus arbitration network illustrated in FIG. 2.

Referring to FIG. 3, a single bus master is illustrated as a representative of the first through N-th bus masters 111 to 11N illustrated in FIG. 2 and depicted at 11 with a suffix omitted from FIG. 3. The illustrated bus master 11 comprises a processing section 31 and an interface control circuit 32 which will become clear in structure and operation. The processing section 31 may be a central processing unit (CPU), a channel device, or the like.

The interface control circuit 32 has terminals (depicted at double circles) connected to the common bus network 102, terminals (depicted at single circles) connected to the processing unit 31, and terminals (depicted at triangles) connected to the other terminals of the interface control circuit 32. More particularly, the terminals for the common bus network 102 are connected to the first through fifth lines 16 to 20 (FIG. 2) and another line for bus clock signals BCLK. The bus clock signals BCLK may be given through the common control bus 101 (FIG. 1) to the respective bus masters 111 to 11N and is received through a receiver 35 (FIG. 3) in each bus master 111 to 11N. As known in the art, the bus clock signals BCLK may be generated by either one of the bus masters 11 or by another system control unit different from the bus masters 11.

The terminals for the processing section 31 and the remaining terminals for the internal control circuit 32 will become clear as the description proceeds.

The illustrated bus master 11 is operable to supply the bus request signal BREQ/ to the forth line 19 and to receive the acknowledgement signal BACK/ through the fifth line 20, as mentioned in conjunction with FIG. 2.

In FIGS. 2 and 3, the bus master 11 is connected to the first through third lines 16 to 18 to produce first and second bus request signals CBRL/ and CBRH/ and a bus lock signal LOCK/, respectively. The first bus request signal CBRL/ is representative of a general or normal bus request while the second bus request signal CBRH/ is representative of a particular bus request or emergency bus request. It is to be noted here that the particular bus request has a degree of priority higher than the normal bus request and is therefore selected when both the particular and the normal bus requests CBRH/ and CBRL/ simultaneously appear from the different bus masters.

The bus lock signal LOCK/ serves to prohibit the right of use from being transferred from one of the bus masters 11 to another in a manner to be described.

The first and the second bus request signals CBRL/ and CBRH/ and the bus lock signal LOCK/ are transmitted from one of the bus masters 11 to the other bus masters and are not delivered to the bus arbiter 12.

The first and the second bus request signals CBRL/ and CBRH/ and the bus lock signal LOCK/ are produced from the interface control circuit 32 in response to first and second internal request signals $\overline{RQL}$ and $\overline{RQH}$ and an internal lock signal $\overline{ILOCK}$ supplied from the processing section 31, respectively. From this fact, it is readily understood that the first and the second internal request signals $\overline{RQL}$ and $\overline{RQH}$ indicate low and high degrees of priority, respectively. Each of the first and the second internal request signals $\overline{RQL}$ and $\overline{RQH}$ and the internal lock signal $\overline{ILOCK}$ becomes active when it is low, as are the cases with CBRL/, CBRH/, and LOCK/.

In the example being illustrated, the interface control circuit 32 is operable in cooperation with an additional interface 36 in a manner to be described.

Figure 4:
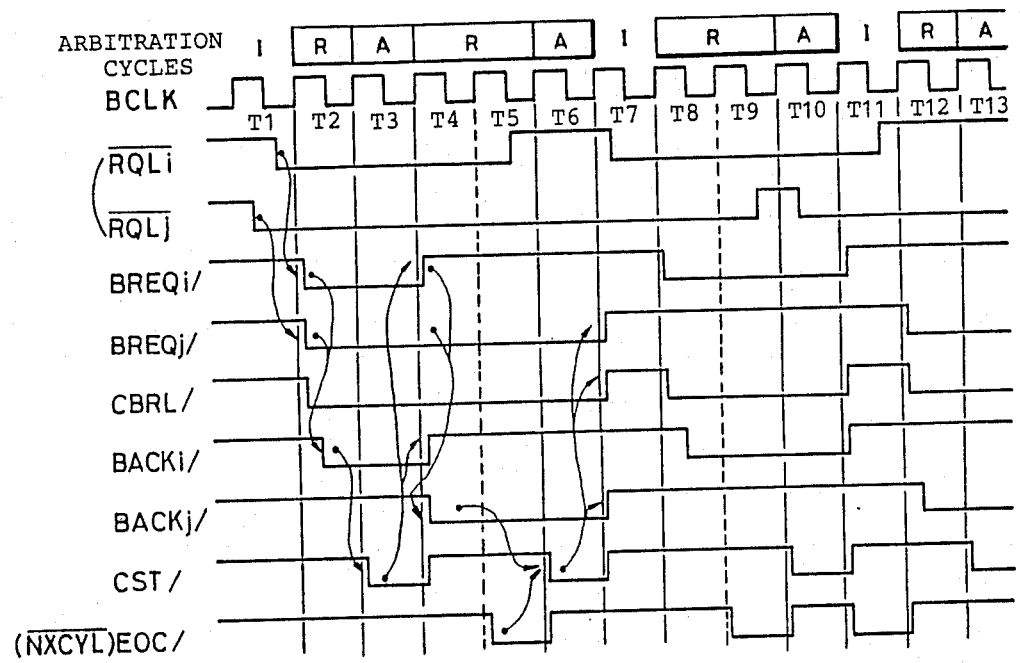
FIG. 4 is a time chart for use in describing a general operation of the bus arbitration network illustrated in FIGS. 2 and 3.

Referring to FIG. 4 together with FIGS. 2 and 3, description will be mainly made about operation of the interface control circuit 32 illustrated in FIG. 3, provided that i-th and j-th bus masters 11i and 11j simultaneously produce the first internal requests depicted at $\overline{RQLj}$ and $\overline{RQLj}$ from the processing sections 31 thereof within a first interval T1 of time defined by a first one of the bus clock signals BCLK. Likewise, second through thirteenth ones of the bus clock signals BCLK define second through thirteenth intervals T2 to T13, respectively. In FIG. 4, it is assumed that an arbitration cycle is idle within the first interval T1 and that the i-th bus master 11i has a degree of priority higher than the j-th bus master 11j.

Specifically, the first internal request $\overline{RQLj}$ at first becomes a low level and the first internal request $\overline{RQLi}$ thereafter becomes the low level in the first interval T1, as illustrated in FIG. 4. Each of the first internal requests $\overline{RQLi}$ and $\overline{RQLj}$ is delivered through an inverter (unnumbered) to NAND gates 41 and 42 in parallel in each of the i-th and the j-th bus masters 11i and 11j to open the NAND gate 42 and is sent through the NAND gate 42 and an additional NAND gate 43 to a first flip flop 46.

Under the circumstances, the first flip flop 46 is set in timed relation to the second one of the bus clock signals BCLK in each bus master 11i and 11j to produce a first flip flop signal. The arbitration cycle proceeds to a request mode R in response to the second one of the bus clock signals BCLK, as shown along a top line in FIG. 4. The first flip flop signal is delivered from the first flip flop 46 to a buffer 47 to be sent as the first bus request signal CBRL/ to the first line 16. In this case, the first bus request signals CBRL/ become the low level in the i-th and the j-th bus masters 11i and 11j. At any rate, the first flip flop 46 and the buffer 47 are operable to supply the other bus masters with the first bus request signal CBRL/ together with the gates 41 to 43.

On the other hand, the first flip flop signal is also delivered through NAND gates 51 and 52 to a buffer 53 to be produced as the bus request signals BREQi and BREQj in the i-th and the j-th bus masters 11i and 11j, respectively. Therefore, the bus request signals BREQi and BREQj become low or active within the second interval T2 and are sent to the bus arbiter 12 (FIG. 2).

Inasmuch as the i-th bus master 11i has high priority in comparison with the j-th bus master 11j, the bus arbiter 12 selects the i-th bus master 11i to deliver the bus acknowledgement signal BACKi to the i-th bus master 11i within the second interval T2. In this connection, the bus acknowledgement signal BACKi becomes the low level in response to the second one of the bus clock signal BCLK. This shows that the bus acknowledgement signal BACKj is kept inactive within the second interval T2.

From this fact, it is understood that the request mode R of the arbitration cycle is finished within a single interval T2.

During the second interval T2, the i-th bus master 11i is operable in response to the bus acknowledgement signal BACKi of the low level. The bus acknowledgement signal BACKi is sent throgh an inverter 56 and an AND gate 57 to the processing section 31 of the i-th bus master 11i as an internal acknowledgement signal ACK.

When the third one of the bus clock signals BCLK is produced, the arbitration cycle is changed from the request mode to an acquisition mode A, as shown in Fig. 4. In this event, the bus acknowledgement signal BACKi is set into a set terminal Q of a second flip flop 62 in synchronism with the third bus clock signal BCLK to be produced through a buffer 63 as a cycle start signal CST/. The cycle start signal CST is representative of a start of a transfer cycle when it becomes low level. The i-th bus master 11i transfers an address, a command, and a data signal to the data transmission bus 103 during the transfer cycle.

When the second flip flop 62 is put into a set state, the cycle start signal CST is also produced through an inverter 64 as an inverted signal $\overline{CSTI}$. Likewise, the second flip flop 62 produces a subsidiary start signal $\overline{CSTX}$ through a reset terminal Q of the second flip flop 62. During the set state of the second flip flop 62, the subsidiary start signal $\overline{CSTX}$ becomes inactive and is sent to the NAND gate 41. The resultant NAND gate 41 is closed.

The cycle start signal CST/ starts the bus cycle to put the common bus network 10 into a busy state. The additional control circuit 36 monitors the cycle start signal CST/ and keeps a busy signal $\overline{BSY}$ into an inactive state during the busy state. As a result, the NAND gate 42 is closed. The first flip flop 46 is reset through the NAND gate 43 in response to closure of the NAND gate 42 and the fourth one of the bus clock signals BCLK. Therefore, the first bus request signal CBRL/ and the bus request signal BREQi become inactive in the i-th bus master 11i.

When the bus request signal BREQi becomes inactive, the bus arbiter 12 puts the bus acknowledgement signal BACKi into an inactive state, as illustrated in FIG. 4.

The arbitration cycle is changed from the acquisition mode A to the request mode R in response to the fourth one of the bus clock signals BCLK. During the fourth interval T4, the j-th bus master 11j keeps the first bus request signal CBRL/ and the bus request signal BREQj/ into the active states, as illustrated in FIG. 4. Under the circumstances, when the bus request signal BREQi becomes inactive, the bus arbiter 12 selects the j-th bus master 11j and supplies the bus acknowledgement signal BACKj of the low level to the j-th bus master 11j.

Herein, let the i-th bus master 11i continue the transfer cycle when the bus acknowledgement signal BACKj becomes active. In this event, the common bus network 10 must not be used by the j-th bus master 11j.

The transfer cycle is monitored in a usual manner by the additional control circuit 36 of the j-th bus master 11j. The additional control circuit 36 keeps a next cycle signal $\overline{NXCYL}$ into an inactive state as long as the transfer cycle lasts in the i-th bus master 11i.

In the j-th bus master 11j, the AND gate 57 is closed in response to the next cycle signal NXCYL. Accordingly, the second flip flop 62 is not set in the j-th bus master 11j. This shows that the j-th bus master 11j can not start transmission or communication.

It is assumed that the i-th bus master 11i finishes the transmission within the fifth interval T5 to produce an end of cycle (EOC) signal in timed relation to the fifth one of the bus clock signals. During the fifth interval T5, and EOC signal is supplied from the i-th bus master 11i to the other bus masters through the data transmission bus 103. In the j-th bus master 11j, the additional control circuit 36 responds to the EOC signal to put the next cycle signal $\overline{NXCYL}$ into the active state and to open the AND gate 57. Consequently, the second flip flop 62 of the j-th bus master 11j is put into the set state in synchronism with the sixth one of the bus clock signals BCLK to produce the cycle start signal CST/. Simultaneously, the internal acknowledgement signal ACK is delivered from the AND gate 57 to the processing section 31 in the j-th bus master 11j.

Thus, the j-th bus master 11j acquires the right to use the common bus network 10 during the sixth interval T6 and starts transmission in a manner similar to that illustrated in conjunction with the i-th bus master 11i.

According to the bus arbitration network shown in FIGS. 2 and 3, it is possible to accomplish fair arbitration among the bus masters, even when different degrees of priority are assigned to the bus masters.

Figure 5:
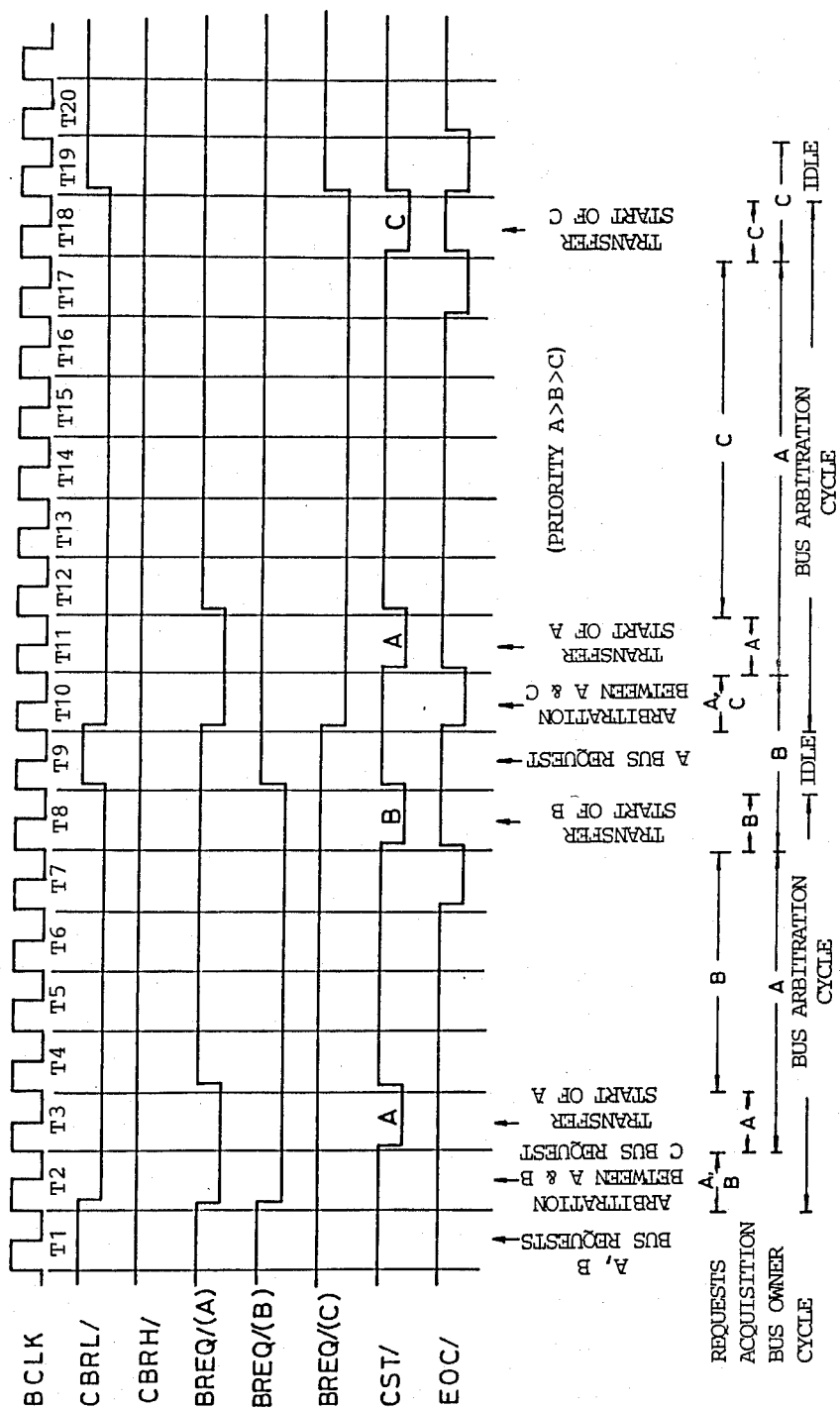
FIG. 5 is a time chart for use in describing another operation of the bus arbitration network illustrated in FIGS. 2 and 3.

Referring to FIG. 5 in addition to FIG. 3, let three of the bus masters be depicted at A, B, and C and have degrees of priority determined in the order of A, B, and C. In this connection, the bus masters A, B, and C have highest, high, and low degrees of priority, respectively. Like in FIG. 4, first through twentieth intervals T1 to T20 of time are defined by first through twentieth ones of the bus clock signals BCLK shown along a top line of FIG. 5.

The bus masters A and B are assumed to issue the first internal request signals $\overline{RQL}$ (not shown in FIG. 5) within the first interval T1 to send the bus request signals BREQ/(A) and BREQ/(B) to the bus arbiter 12 (FIG. 2) in synchronism with the second bus clock signal BCLK, as shown in FIG. 5. In this event, the bus request signals BREQ/(A) and BREQ/(B) become low to specify active states in the manner mentioned before. Concurrently, the first bus request signal CBRL/ of the low level appears on the first line 16. As a result, the bus arbiter 12 carries out arbitration between the bus masters A and B during the second interval T2. Such arbitration is carried out by comparing the degrees of priority which can be detected by monitoring the bus request signals BREQ/(A) and BREQ/(B).

In the example being illustrated, it is assumed that the bus master C also issues the first internal bus request signal $\overline{RQL}$ of the low level within the second interval T2. Let the interface control circuit 32 illustrated in FIG. 3 be operated in the bus master C. In this case, the first bus request signal CBRL/ is already kept in the active state by the bus masters A and B and is sent to the NAND gate 42. As a result, the first flip flop 46 is not set in the bus master C because of closure of the NAND gate 42. The bus request signal BREQ/(C) is kept at the inactive state and is sent to the bus arbiter 12, as shown in FIG. 5.

Inasmuch as the bus master A is higher in priority than the bus master B, the bus arbiter 12 selects the bus master A on reception of the bus request signals BREQ/(A) and BREQ/(B) to deliver the bus acknowledgement signal BACK/(A) (not shown) to the bus master A within the second interval T2. Thus, the arbitration is finished in each interval of time.

Responsive to the third bus clock signal BCLK, the bus acknowledgement signal BACK/(A) is set in the second flip flop 62 of the bus master A and is produced as the cycle start signal CST of the low level. Thus, the bus master A acquires the right to use the common bus network 10 and becomes a bus owner. The illustrated bus cycles of the bus master A lasts between the third and the seventh intervals T3 and T7 and the EOC signal is produced from the bus master A in the seventh interval T7. During the bus cycles of the bus master A, the bus master B continuously keeps the bus request signal BREQ/(B) at the active state.

Under the circumstances, the bus master B becomes a bus owner in times relation to the eighth bus clock signal BCLK and starts transmission or transfer within the eighth interval T8 by rendering the cycle start signal CST/ into the active state.

Let the bus master A produce another one of the first internal bus request signals $\overline{RQL}$ within the ninth interval T9 during which the bus cycles of the bus master B lasts. However, the bus cycles of the bus master B are not interrupted even when the internal bus request signal $\overline{RQL}$ is produced by the bus master A having the degree of priority higher than the bus master B.

More specifically, the first flip flop 46 of the bus master A is reset in response to the fourth bus clock signal BCLK (T4) while the first flip flop 46 of the bus master B is reset in response to the ninth bus clock signal BCLK (T9), as shown in BREQ/(A) and BREQ/(B) in FIG. 5. This means that the first bus request signal CBRL/ is put into the inactive state in response to the ninth bus clock signal BCLK which defines the ninth interval T9.

As mentioned before, the first internal bus request signal $\overline{RQL}$ is produced from the bus master A during the ninth interval T9. In addition, the first internal bus request signal $\overline{RQL}$ is also kept from the interval T2 in the bus master C. Accordingly, both of the bus masters A and C produce the first internal bus request signals $\overline{RQL}$ within the ninth interval T9. Under the circumstances, the NAND gates 42 are opened in the interface control circuits 32 of the bus masters A and C to set the first flip flops 46 of the bus masters A and C in response to the tenth bus clock signal BCLK. Consequently, the first bus request signal CBRL/ and the bus request signals BREQ/(A) and BREQ/(C) become the active states, respectively.

When the bus cycles of the bus master B are finished in the tenth interval T10 by producing the EOC signal, the bus arbiter 12 delivers the bus acknowledgement signal BACK/(A) to the bus master A in the eleventh interval T11 with reference to the degrees of priority of the bus masters A and C. As a result, the bus master A becomes a bus owner in the eleventh interval T11 by acquiring the right to use the common bus network 10. After transmission or transfer of the bus master A, the bus master C becomes a bus owner in the eighteenth interval T18 to start the transmission.

Once the first bus request signal CBRL/ is put into the active state in a certain one of the bus masters, the first flip flop 46 is not set in the interface control circuit 32 of the other bus masters shown in FIG. 3, even when the first internal bus request signal $\overline{RQL}$ is produced by a bus master having a higher degree of priority. This is because the NAND gate 42 is not opened after production of the first bus request signal CBRL/ of the low level. As a result, the common bus network 10 is occupied by the certain bus master having the first flip flop 46 put into a set state. After the certain bus master occupies the common bus network 10, the first internal bus request signal $\overline{RQL}$ is received even when the $\overline{RQL}$ in question is issued from the bus master of the higher priority.

It is therefore possible for the interface control circuit 32 to offer fair service even to a bus master of a low priority.

Figure 6:
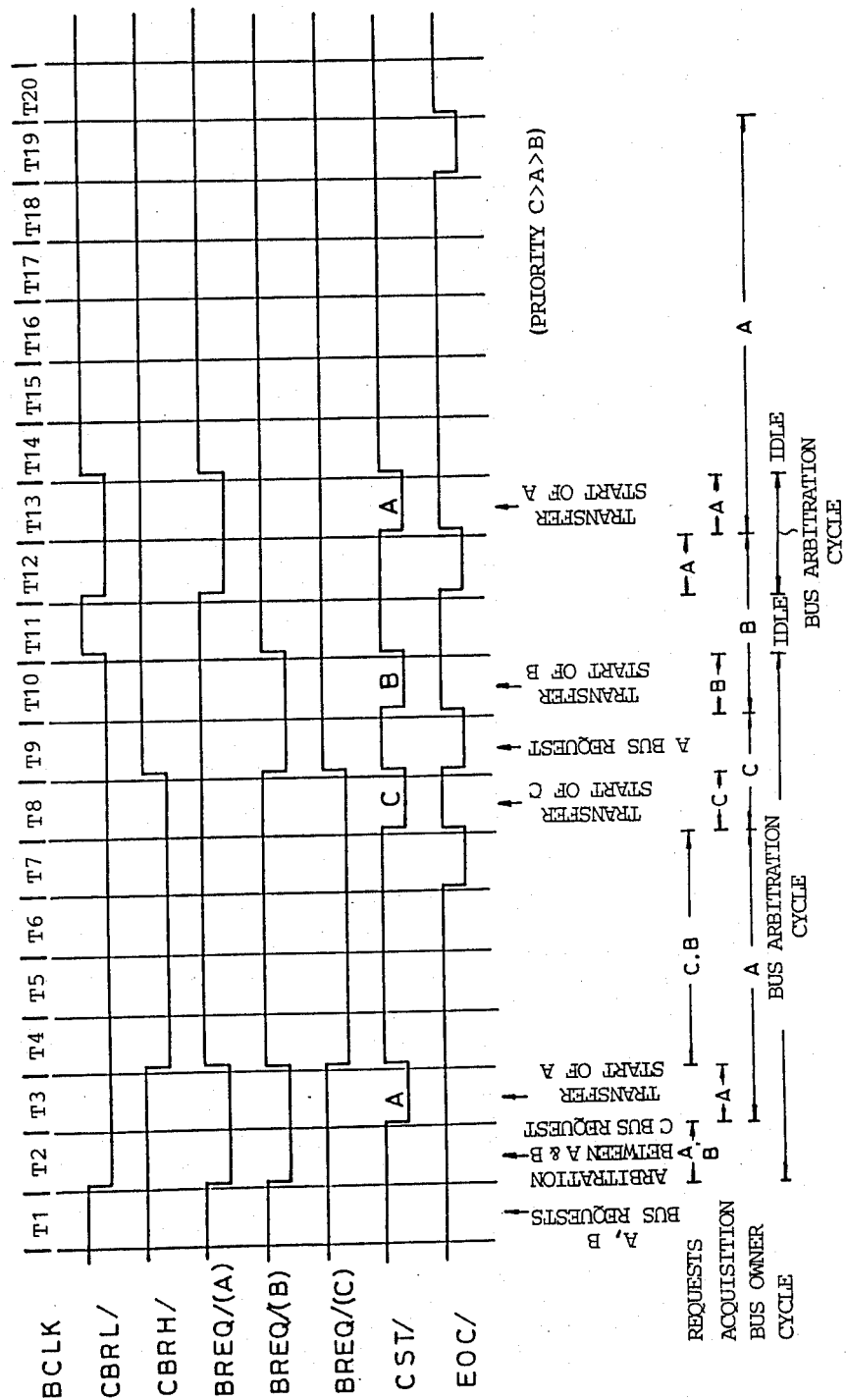
FIG. 6 is a time chart for use in describing a further operation of the bus arbitration network illustrated in FIGS. 2 and 3.

Referring to FIG. 6 in addition to FIG. 3, it is assumed that the bus masters A, B, and C are operated in a manner similar to those illustrated in FIG. 5 except that the bus master C produces the second internal bus request signal $\overline{RQH}$ representative of the particular bus request. In this connection, let the bus master C have the priority higher than the bus masters A and B. It is to be noted that the priority of the bus master A is higher than the bus master B, like in FIG. 5.

When the bus masters A and B produce the first internal bus request signals $\overline{RQL}$ in the first interval T1, the first flip flops 46 are put into the set states in the bus masters A and B in response to the second bus clock signal BCLK, as mentioned in FIG. 5. As a result, the first bus request signal CBRL/ and the bus request signals BREQ/(A) and (B) becomes active states, respectively.

The second internal bus request signal $\overline{RQH}$ is produced by the bus master C within the second interval T2. The second internal bus request signal $\overline{RQH}$ is supplied through an inverter (unnumbered) and a NAND gate 67 to a NAND gate 73. However, the first bus request signal CBRL/ is already put into the active state on production of the second internal bus request $\overline{RQH}$ and is sent to the bus master C. In the bus master C, the first bus request signal CBRL/ is sent through an inverter 71 and a NAND gate 72 to close a NAND gate 73. The closure of the NAND gate 73 keeps a third flip flop 74 at a reset state through the NAND gate 68. Therefore, the bus masters can not produce the second bus request signal CBRH/ even when the third bus clock signal BCLK is supplied to the third flip flop 74.

Under the circumstances, the bus master A is selected by the bus arbiter 12 during the third interval T3 in the above-mentioned manner and becomes a bus owner. The bus master A starts transfer of the address and so on by putting the cycle start signal CST/ into the active state like in FIG. 5. The transfer of the bus master A lasts until the seventh interval T7.

On the other hand, when the interface control circuit 32 of the bus master C is supplied with the cycle start signal CST/ of the low level, the cycle start signal CST/ is delivered through the inverter 64 as the inverted start signal $\overline{CSTI}$ to the NAND gate 72. As a result, the NAND gate 72 produces an output of a high level to open the NAND gate 73 and to set the third flip flop 74 in response to the fourth bus clock signal BCLK. Accordingly, the bus master C puts the second bus request signal CBRH/ through a buffer 74 and the bus request signal BREQ/(C) into the active states in response to the fourth bus clock signal BCLK.

The seocnd bus request signal CBRH/ is thus put into the active state and is sent to the bus masters A and B. In the bus master B, the second bus request signal CBRH/ is supplied to the NAND gate 51 (FIG. 3) to forcibly put the bus request signal BREQ/(B) into the inactive state, as shown in FIG. 6. The bus master A carries out operation in the manner described in conjunction with FIG. 5.

In this situation, when the bus master A finishes the bus cycles in the seventh interval T7, the bus master C is selected by the bus arbiter 12 and is supplied with the bus acknowledgement signal BACK/ (not shown in FIG. 6). The bus master C starts the bus cycles in response to the eighth bus clock signal BCLKk and put both the second bus request signal CBRH/ and the bus request signal BREQ/(C) into the inactive states in response to the ninth bus clock signal BCLK.

Accordingly, the bus master B is returned back to states in the second and the third intervals T2 and T3 and is put into available states of the common bus network 10.

The remaining operations are similar to those illustrated in FIG. 5 and will not be described any longer.

Figure 7:
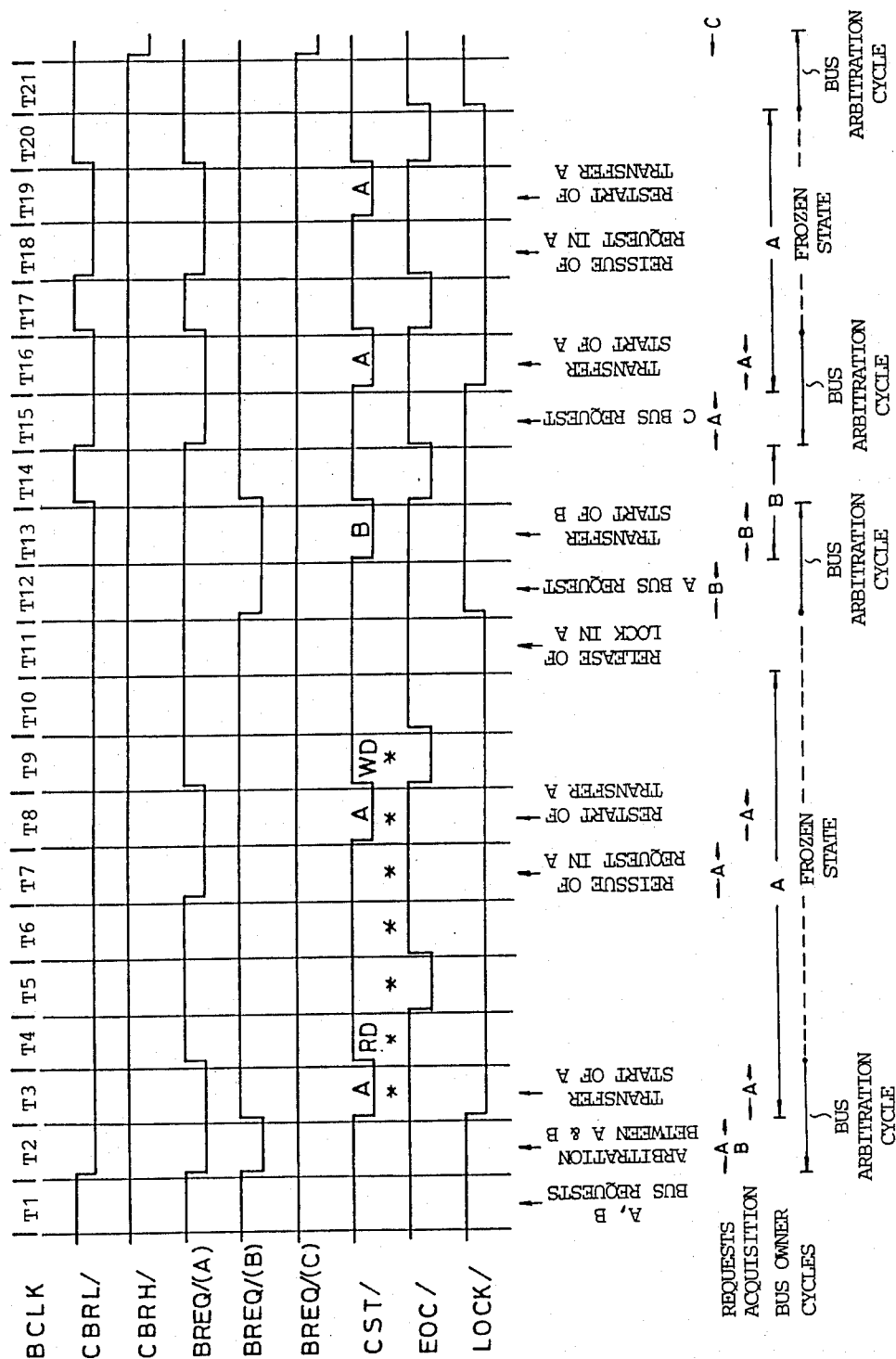
FIG. 7 is a time chart for use in describing another operation of the bus arbitration network illustrated in FIGS. 2 and 3.

Referring to FIG. 7 afresh and FIG. 3 again, description will be made about control operation carried out when one of the bus masters continuously monopolizes or occupies the common bus network 10 over a plurality of consecutive bus cycles, regardless of a degree of priority in the one bus master. Such control operation is performed when the one bus master carries out an operation known as "TEST and SET LOCK."

Herein, it is assumed that bus masters A, B, and C are operated on conditions which are similar to those illustrated in FIG. 5 except that the bus master A executes a "Read modify write" instruction. Like in FIG. 5, the bus master A starts the bus cycles in the third interval T3, as understood from CST/ in FIG. 7, after both the bus request signals BREQ/(A) and BREQ/(B) are put into the active states within the second interval T2. This shows that the bus master A has a high priority compared with the bus master B and becomes a bus owner by acquiring the right to use the common bus network 10.

In order to execute the above-mentioned instruction, the processing section 31 of the bus master 31 supplies the interface control circuit 32 during the third interval T3 with the interval lock signal $\overline{ILOCK}$ for locking the common bus network 10. Responsive to the internal lock signal $\overline{ILOCK}$, the interface control circuit 32 puts a forth flip flop 81 into a set state through gates 82, 83, 84, and 85. Simultaneously, the lock signal LOCK/ becomes the active state or the low level through a NAND gate 86 and a buffer 87.

The lock signal LOCK/ of the low level is delivered from the bus master A to the bus masters B and C through the third line 18. In the bus masters B and C, the lock signal LOCK/ of the low level is sent through an inverter 91 and an NAND gate 92 to the NAND gate 51 and another NAND gate 93. The resultant NAND gates 51 and 93 are closed to put the bus request signals BREQ/(B) and BREQ/(C) into the inactive states in the third interval T3. Thus, the right to use the common bus network 10 is continuously allocated to the bus master A without being transferred to the bus masters B and C. In other words, the transfer of the right to use the common bus network 10 is prohibited in the above-mentioned manner by the use of the gates 91, 92, 93, and 53.

The bus master A accesses a specific address of a memory (not shown) to read a data signal out of the specific address in the fourth interval T4 and the fifth interval T5, as indicated at RD. Thereafter, access to the specific address is prohibited until the bus master A writes a modified data signal into the specific address. In the example being illustrated, such a modified data signal is written into the memory in the ninth interval T9, as indicated at WD, after the bus request signal BREQ/(A) is reissued in the seventh interval T7 and the bus master A restarts transfer in the eighth interval T8.

When the processing section 31 of the bus master A puts the internal lock signal $\overline{ILOCK}$ into the inactive state in the tenth interval T10, the fourth flip flop 81 is reset in response to the eleventh bus clock signal BCLK through the gate 82, a NAND gate 96, and the gate 85. Therefore, the lock signal LOCK/ becomes an unlocked or inactive state in the twelfth interval T12. In consequence, the bus request signal BREQ/(B) and BREQ/(C) are issued to the bus arbiter 12 in the twelfth interval T12. In the above-mentioned manner, the bus master B only acquires the right to use the common bus network 10 to become a bus owner in the thirteenth interval T13, although the bus master A issues the first internal bus request signal $\overline{RQL}$ during the twelfth interval T12.

As shown along a bottom line of FIG. 7, the arbitration is interrupted during "Read modify write" operation from the fourth interval T4 to the eleventh interval T11. In other words, the arbitration is put into a frozen state.

In the above-mentioned interface control circuit 32, the first and the fourth flip flops 46 and 74 and the buffers 47 and 77 are operable to supply the other bus masters with the first and the second bus request signals CBRL/ and CBRH/ in cooperation with the gates, such as 41 to 43, 67 and 68, and 71 to 73, and may collectively be called a first request circuit. On the other hand, a combination of the gates 51, 52, and 93 and the buffer 53 serves to supply the bus arbiter 12 with the bus request signal BREQ/ and may be referred to as a second request circuit. Moreover, the gates 51 and 93 are operable to interrupt production of the bus request signal BREQ in the presence of the lock signal LOCK/ or the second bus request signal CBRH/ sent from the other bus masters and may be named an interrupting circuit. The gate 52 and the buffer 53 may be called a signal producing circuit for producing the bus request signal BREQ in the absence of the above-mentioned lock signal LOCK/ and second bus request signal CBRH/.

In addition, a combination of the second flip flop 62 and the gates connected to the second flip flop 62 is operable to indicate start of communication and may be named a start indicating circuit. Likewise, the fourth flip flop 81 and the gates 82 through 87 serve to supply the other bus masters with the lock signal LOCK/and may be called a lock signal circuit.

Referring to FIG. 8, states of arbitration can be specified by monitoring signal relationships among the first and the second bus request signals CBRL/ and CBRH/, the bus request signal BREQ/, and the bus acknowledgement signal BACK/. As mentioned before, the first and the second bus request signals CBRL/ and CBRH/ are common to the respective bus masters while the bus request signal BREQ/ and the bus acknowledgement signal BACK/ are assigned to each of the bus masters. In this connection, the first and the second bus request signals CBRL/ and CBRH/ may collectively be called a common request signal while the bus request signal BREQ/ may be an individual request signal. In this viewpoint, it is said that arbitration is carried out by the use of the common and the individual request signals. Inasmuch as the common request signal is transmitted and received among the bus masters and the individual request signal alone is monitored by the bus arbiter, it is possible to alleviate burden imposed on the bus arbiter. Therefore, the bus arbiter may be simple in structure and carry out arbitration at a high speed.

More particularly, the idle state of the common bus network is specified by the high levels (H) of the first and the second bus request signals CBRL/ and CBRH/, the bus request signal BREQ/, and the bus acknowledgement signal BACK/, as shown along a first row in FIG. 8. A busy state is also specified by the high level or levels of at least one of the first and the second bus request signals CBRL/ and CBRH/, as illustrated in FIG. 8. In addition, when both the first and the second bus request signals CBRL/ and CBRH/ take the low levels (L), it is judged that the busy state is due to the particular bus request indicated by the second bus request signal CBRH/, as shown by an asterisk. Likewise, the bus request signal BREQ/ becomes the low level (L) in course of at least one of the normal and the particular bus requests. Acknowledgement is indicated by the low level (L) of the bus acknowledgement signal BACK. At any rate, the particular bus request is being issued and is accepted when both the first and the second bus request signals CBRL/ and CBRH/ take the low levels (L), as indicated by asterisks.

As mentioned above, the common request signal is transmitted among the bus masters while the individual request signals are individually sent from the respective bus masters to the bus arbiter. The common request signal is divided into the first and the second bus request signals CBRL/ and CBRH/ which selectively appear in each bus master in consideration of the degree of priority. The second bus request signal CBRH/ is processed in preference to the first bus request signal CBRL/ in each bus master. As a result, each of the bus masters shares partial processing related to the priority while the bus arbiter shares the remaining processing related to the priority. This serves to simplify the bus arbiter in structure and to shorten a time for arbitration.

What is claimed is:

1. A bus arbitration network comprising a common bus network, a plurality of bus masters, and an arbiter coupled to said bus masters through said common bus network for arbitrating use of said common bus network, each of said bus masters carrying out communication with each of others of said bus masters through said common bus network and comprising:

internal request producing means for producing an internal normal request signal and an internal particular request signal which indicate an internal normal request and an internal particular request which are related to use of said common bus network;

first supply means coupled to said internal request producing means for supplying said others of the bus masters through said common bus network with a normal bus request signal and a particular bus request signal in response to said internal normal request signal and said internal particular request signal, respectively; and second supply means coupled to said first supply means for supplying said bus arbiter with a bus request signal in response to each of said internal normal request signal and said internal particular request signal;

said bus arbiter comprising:

means responsive to said bus request signals sent from said bus masters for selecting one of said bus masters as a selected bus master; and means for delivering to said selected bus master an acknowledgement signal representative of an acknowledgement of the use of said common bus network;

said each bus master further comprising:

means for indicating start of the communication in response to said acknowledgement signal.

2. A bus arbitration network as claimed in claim 1, wherein said particular bus request signal has a degree of priority higher than said normal bus request signal.

3. A bus arbitration network as claimed in claim 1, wherein each of said bus masters comprises:

lock signal supply means for supplying said others of the bus masters through said common bus network with a lock signal which prohibits said common bus network from being used by said others of the bus masters.

4. A bus arbitration network as claimed in claim 3, wherein said second supply means comprises:

interrupting means coupled to said first and said second supply means and said lock signal supply means for interrupting production of said bus request signal when the particular bus request signal and the lock signal are given from said others of the bus masters to the first supply means and the lock signal supply means of each of said bus masters; and means coupled to said interrupting means for supplying the bus request signal to the others of said bus masters when production of the bus request signal is not interrupted by said interrupting means.

5. A bus arbitration method for use in an information processing system comprising a common bus network, a plurality of bus masters, and an arbiter coupled to said bus masters through said common bus network for arbitrating use of said common bus network, each of said bus masters carrying out communication with each of others of said bus masters, said method comprising, in each of said bus masters, the steps of:

selectively producing normal and particular bus requests;

selectively supplying the others of said bus masters through said common bus network with normal and particular bus request signals resulting from said normal and said particular bus requests, respectively, when the normal and the particular bus request signals are not received from the others of said bus masters;

supplying said arbiter through said common bus network with a bus request signal when the normal and the particular bus request signals are not received from the others of said bus masters; and prohibiting production of said bus request signal in response to the particular bus request signal given from the others of said bus masters when said bus request signal for said normal bus request is being produced from each of said bus masters.

6. A bus arbitration method as claimed in claim 5, further comprising the steps of:

supplying said others of the bus masters through said communication bus network with a lock signal which prohibits said common bus network from being used by said others of the bus masters; and interrupting production of said bus request signal when the lock signal is given from said others of the bus masters.

* * * * *